(No Model.)
J. E. KNAPP.
GATE.
No. 510,802.                    Patented Dec. 12, 1893.
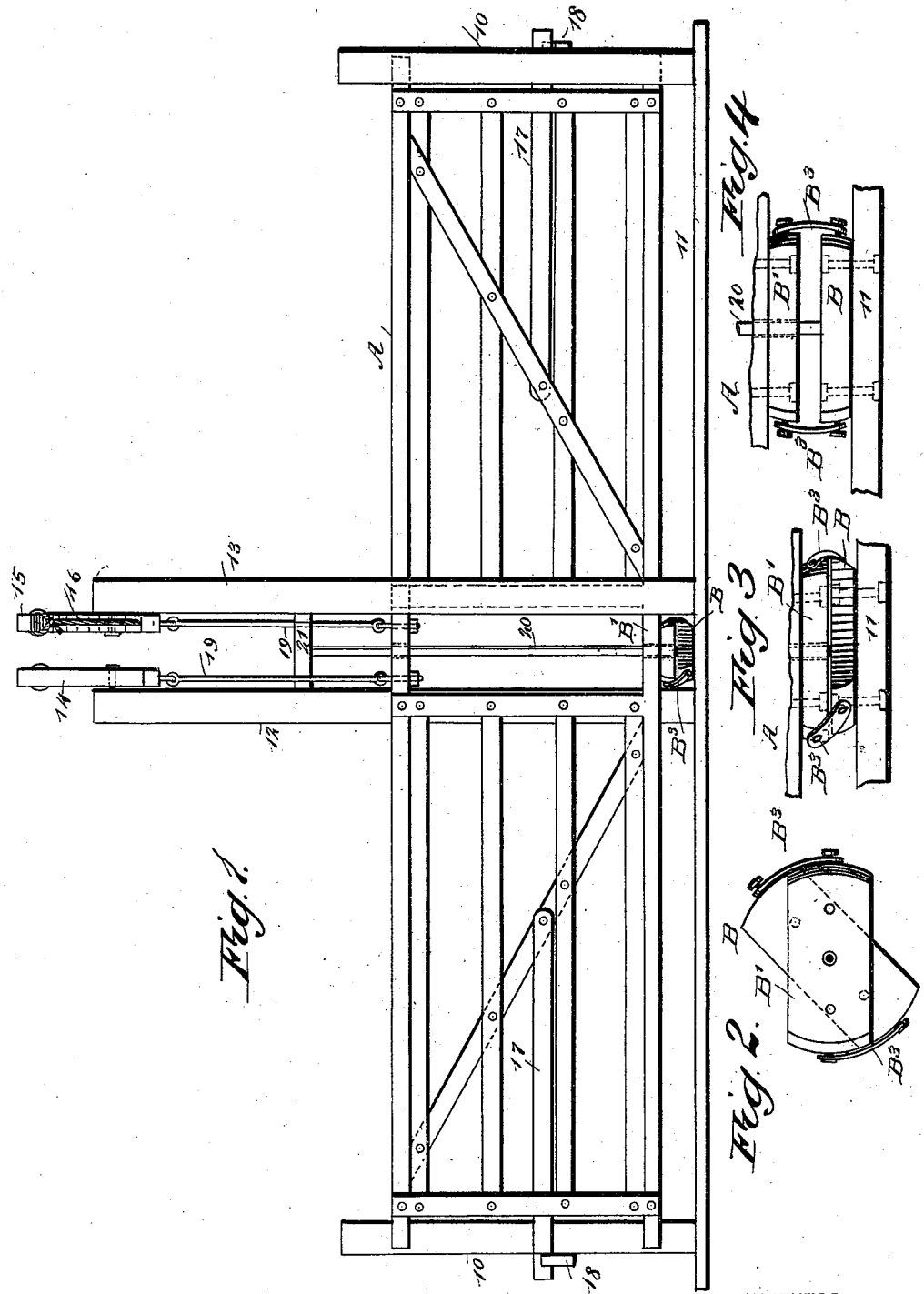
WITNESSES:
F. McArdle
C. Sedgwick
INVENTOR
J. E. Knapp
Munn & Co
ATTORNEYS.

UNITED STATES PATENT OFFICE.

JACOB E. KNAPP, OF BROWNSVILLE, OREGON.

GATE.

SPECIFICATION forming part of Letters Patent No. 510,802, dated December 12, 1893.

Application filed March 8, 1893. Serial No. 464,135. (No model.)

*To all whom it may concern:*

Be it known that I, JACOB E. KNAPP, of Brownsville, in the county of Linn and State of Oregon, have invented a new and useful Improvement in Gates, of which the following is a full, clear, and exact description.

My invention relates to an improvement in gates, and it has for its object to provide a gate of simple, durable and economic construction, capable of being swung from its center or from one end through the manipulation of levers extending one over and beyond each side of the gate when in its closed position.

A further object of the invention consists in providing a simple and durable mechanism whereby when either of the levers is depressed the gate will be elevated, and whereby the act of elevating the gate will cause it to swing to an open or a closed position whichever lever is manipulated.

A further feature of the invention consists in constructing a gate in such manner that it will be maintained in an open or a closed position until a lever is manipulated, and whereby when the gate is closed it can not be opened by animals, thus especially fitting the gate for use upon farms.

Another object of the invention is to construct the gate so that it may be located upon a hill side and operated with equally good effect as when operated upon level ground.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a front elevation of a double gate having the improvement applied thereto. Fig. 2 is a plan view of the operative mechanism of the gate, illustrating it in its normal position, the position which the mechanism maintains when the gate is fully opened or fully closed. Fig. 3 is a side elevation of the mechanism when in the position shown in Fig. 2; and Fig. 4 is a side elevation of the mechanism, showing it in the position it assumes when the gate is partially open or partially closed.

In carrying out the invention the latch posts 10 of the gate are arranged at a predetermined distance apart, and a base strip or beam 11 is usually extended from the center, three feet or more. At each side of the center of this base strip an upright or standard is erected, the said uprights or standards being designated respectively as 12 and 13. Each upright or standard has a lever fulcrumed upon it, the levers being designated as 14 and 15, the fulcrum of the lever being between the center and one end, the longer portion of the lever extending outward beyond the standard to which the lever is attached. The longer end of one lever extends beyond one face of the standards, while the longer end of the other lever extends beyond the opposite face of the standards; thus one lever extends beyond each side of the opening to be closed by the gate A. Each lever at its outer end is provided with a rope 16, or the equivalent thereof, which extends vertically downward within reach of a person located in a vehicle, or within reach of a person standing upon the ground.

The gate A, may be of any approved construction, and extends between the two standards 12 and 13, the standards being so located that one is slightly in advance of the other, both of the standards 12 and 13 being somewhat out of alignment with the latch posts 10, in order that when the gate is in its closed position latches 17 carried by the gate will engage with keepers 18, located at opposite sides of the gate posts; that is to say, a latch at one end of the gate will engage with the inner edge of the gate post while a latch at the opposite end of the gate will engage with the outer face of the gate post, as shown best in Fig. 1. The upper rail of the gate, at each side of its center, or that portion of the rail located between the standards or uprights 12 and 13, is connected with the shorter ends of the levers through the medium of links 19, or their equivalents.

Between the standards or uprights 12 and 13 a block B, is firmly attached upon the base beam 11, the block being located diagonally upon the beam, and standing at an angle of about forty-five degrees with relation to the lower rail of the gate and the said base beam. This block, as is shown in Figs. 2, 3 and 4, is at its ends, so curved vertically and transversely as to accommodate the curved links B³ hereinafter described, in the movements of the latter; while its upper and lower faces are preferably flat. A second block B', of like construction and of the same size, is secured to the central portion of the under rail of the gate, the gate block B', extending longitudinally of the rail, so that one block will be located at an angle of forty-five degrees to the other block, as shown in Figs. 1 and 2, which position they maintain when the gate is fully closed or fully open, and the opposing faces of the two blocks are practically in contact. The ends of the two blocks B and B' are connected by curved links B³, the links being pivotally connected with the blocks. The gate turns upon a vertical shaft 20, which shaft is firmly secured to the lower block, or to the support to which that block is attached, and the said shaft passes upward loosely through the gate block B', through the top and bottom rails of the gate, and the upper end of the shaft is located within a beam 21, extending transversely from one standard or upright to the other.

In the operation of the gate, it is adapted to open outward, and when the gate is approached by a person it is simply necessary to draw downward upon the lever extending over the road at the side of the gate near which the party is standing. By so doing the gate is lifted vertically and as it is lifted the two blocks standing at an angle to each other will, by reason of their link connection, be carried to a position parallel to each other, as shown in Fig. 4, which will cause the gate to partially open, and the momentum gathered by the gate in being lifted and swung will cause the gate to continue to turn until one block has passed at its ends slightly over the other block, the block attached to the gate being the moving one, that is, the momentum will bring the pivots of the link out of vertical alignment, past their dead center, so to speak, whereupon the gate will be swung fully open as the upper block will gravitate downward and cross and engage with the under block at the same angle it maintained when the gate was closed, the upper block, however, having been turned about half way round. The gate will now stand fully open, and after the person has passed through the gate, by drawing downward upon the other lever the gate will be again lifted and will swing to its closed position. The weight of the gate as well as that of the upper block materially assists in opening it.

It is evident that although a double gate is shown in the drawings and the gate illustrated is operated from the center, the invention may be applied to a single gate and the gate operated from one end, since in that event the top and bottom rails need only be projected from the body of the gate between the two standards. The form of the blocks may be varied and likewise the location and form of their link connection.

Having thus described my invention, I claim as new and desire to secure by Letters Patent—

1. In a lever-operated gate, a swinging mechanism, the same consisting of a block attached to a fixed support, a second block attached to the gate and located over the fixed block, one block normally crossing the other diagonally, and a link connection between the ends of the blocks, as and for the purpose specified.

2. The combination, with a gate having a block secured to its lower rail, of a fixed block of corresponding shape located beneath the gate block and crossing it an angle, links connecting the ends of the blocks, the pivot of the gate passing loosely through the gate block and being fixed with relation to the fixed block, and a lifting mechanism connected with the gate, as and for the purpose specified.

3. The combination with a swinging vertically movable gate, of links pivotally connected with such gate at both sides at the bottom and having their lower ends pivoted to a fixed base or support below the gate, normally out of vertical alignment with their upper ends, and means for lifting the gate, substantially as described.

JACOB E. KNAPP.

Witnesses:
H. B. MOYER,
C. L. KNAPP.